March 14, 1961

J. HIMKA 2,974,998

ADJUSTABLE EASY ENTRANCE SEAT FOR AUTOMOBILES

Filed Sept. 22, 1955

Inventor
John Himka
By Paul Fitzpatrick
Attorney

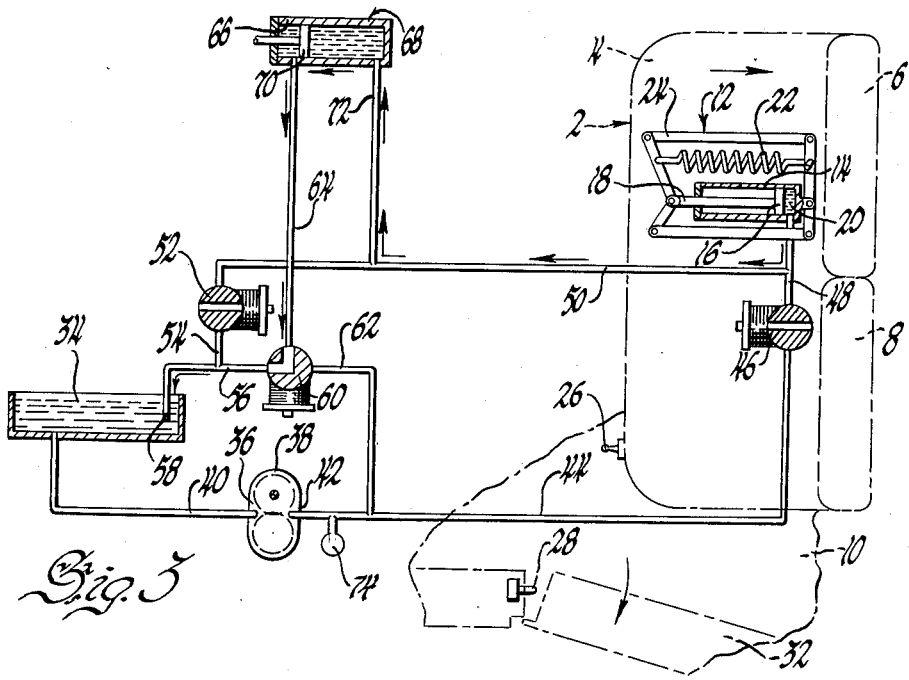
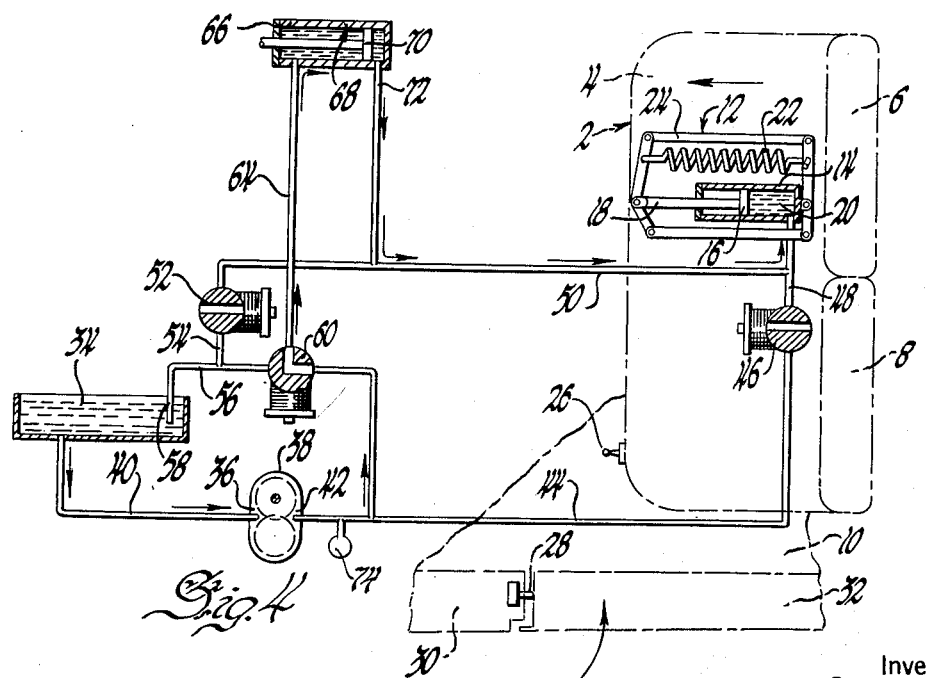

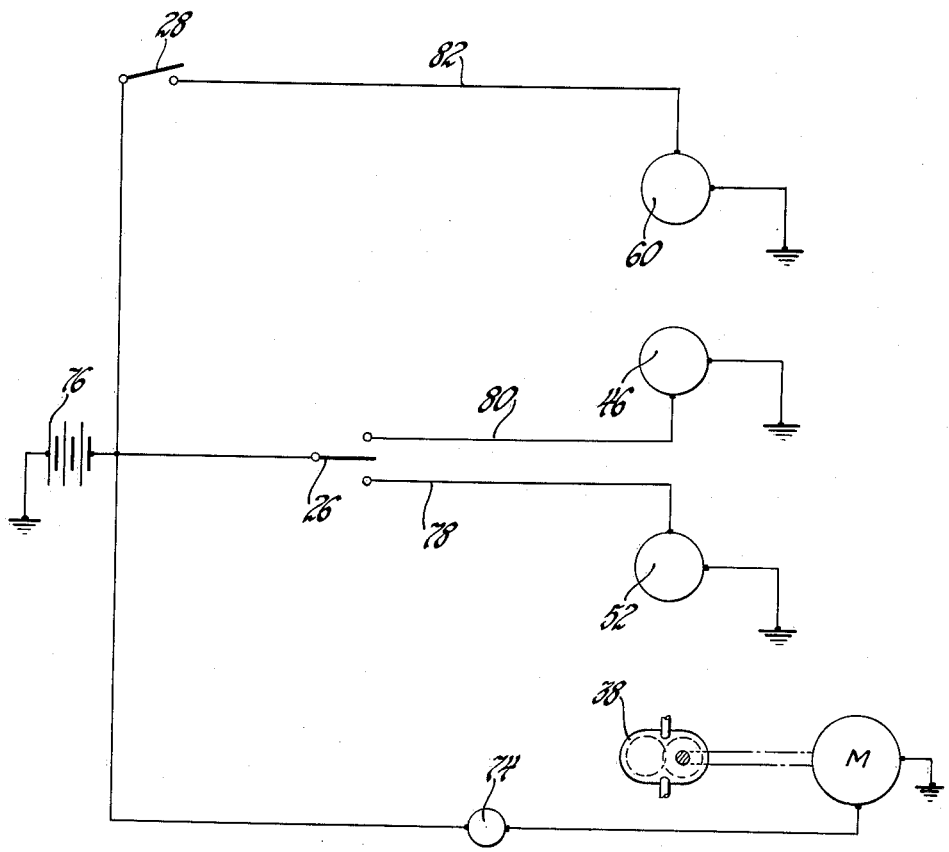

United States Patent Office 2,974,998
Patented Mar. 14, 1961

2,974,998

ADJUSTABLE EASY ENTRANCE SEAT FOR AUTOMOBILES

John Himka, Detroit, Mich., assignor to General Motors Corporation, Detroit, Mich., a corporation of Delaware Filed Sept. 22, 1955, Ser. No. 535,971

5 Claims. (Cl. 296—65)

This invention relates to vehicle seats and more particularly to automatically operable seat actuating mechanism providing maximum clearance for entrance and exit from the front seat.

It has long been the general practice in vehicle seat construction to provide means for adjusting the operator's seat fore and aft of the vehicle body floor, in order to permit selective positioning of the seat in the most convenient location with respect to the vehicle controls. In the past, the majority of seat adjuster mechanisms were of the manually operable mechanical type having spring biased locking means for maintaining the seat in the selected position. To alter the fore and aft position of the seat, the operator manually released the locking means and exerted either forward or rearward pressure on the seat structure to shift it to the desired position. More recently, a large proportion of vehicles have been equipped with power operated mechanisms for accomplishing the same purpose. In some instances, the power operated mechanisms utilize electric motor driven mechanisms, while in other instances, adjustment of the seat is accomplished by a hydraulic mechanism which is energized by means of an electrically driven hydraulic pump. Although both of the latter types of mechanisms virtually eliminate the manual effort formerly required to adjust the seat to a desired position, all such mechanisms require manual selection by the operator of the most convenient seat position. However, in many instances, the most convenient seat position for vehicle operation may be extremely difficult to enter or alight from unless the seat is actuated either partially or completely to its rearwardmost position. This condition has become increasingly aggravated by the current trend to automotive body construction of extremely low standing height. In addition, the even more recent trend toward "wraparound" windshields has to some extent further reduced the available door clearance adjacent the front seat, making entrance and exit to and from the front seat even more difficult.

An object of the present invention is to provide a fore and aft adjustable vehicle front seat which is automatically displaceable to its rearwardmost position responsive to opening of the adjacent vehicle door, thereby affording maximum clearance for entrance to and exit from the seat.

Another object is to provide a front seat adjuster control mechanism which is effective upon opening of the vehicle door to actuate the seat to its rearwardmost limited movement and to return the same to a predetermined forwardly displaced position upon closing of the door.

A further object is to provide a seat control mechanism of the type described wherein the predetermined forwardly displaced position to which the seat is returned corresponds to a manually selected position established by the operator when the vehicle door is closed.

Still another object is to provide a seat adjuster mechanism which is selectively operable from a remote point to actuate the seat both forwardly and rearwardly to a desired vehicle operating position, there being additional automatic means arranged to respond to opening and closing of the vehicle door, whereby the seat is automatically moved to its rearwardmost limit of adjustment upon opening of the door and returned to driver selected position upon closing of the vehicle door.

These and other objects, advantages and features of the invention will become more fully apparent as reference is had to the accompanying drawings and specification wherein:

Fig. 3 is a view similar to Figs. 1 and 2, showing the position of the valves and flow path of hydraulic fluid when the seat is being automatically actuated rearwardly responsive to opening of the vehicle door.

Fig. 4 is a view similar to Figs. 1, 2 and 3, showing the position of the valves and the flow path of hydraulic fluid when the seat is being automatically actuated forwardly to a previously manually selected position responsive to closing of the vehicle door; and Fig. 5 is a schematic wiring diagram of an electrical circuit for the mechanism.

Figure 1:
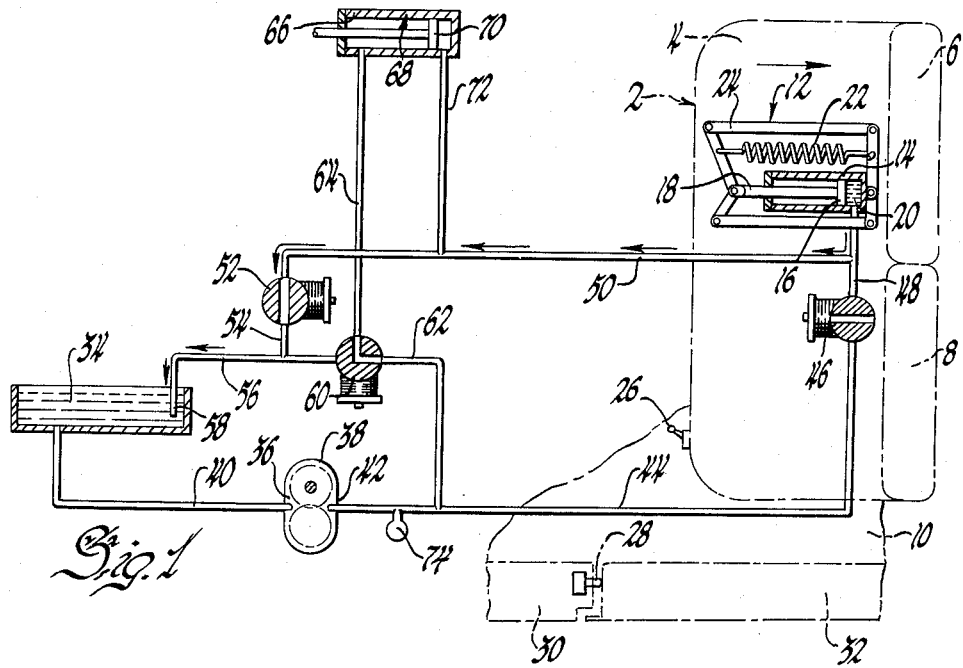
Fig. 1 is a diagrammatic view of a front vehicle seat hydraulic actuating mechanism and control system therefor, showing the position of the valves and flow path of hydraulic fluid when the seat is actuated forwardly by the manual controlled selector.

Referring now to the drawings, particularly Figs. 1, 2, 3 and 4, there is shown in dotted lines a conventional vehicle front seat 2 of the type having a full width bench-type cushion 4 and a pair of forwardly tiltable generally vertically extending seat backs 6 and 8 arranged in side by side relation at the rear edge of cushion 4. It will be understood that seat 2 is intended for mouting in a conventional manner on spaced apart fore and aft guide mechanisms, not shown, of the type permitting limited longitudinal adjustment of the seat with respect to the vehicle body floor 10. For a complete disclosure of a mechanism of this type, reference may be had to U.S. 2,417,523, Simpson, assigned to General Motors Corporation. Disposed between the seat cushion 4 and body floor 10 is a hydraulic adjuster mechanism 12. Since the precise details of construction of mechanism 12 form no part of the present invention, a detailed description thereof will be omitted. It will be understood, however, that the cylinder 14 is fixed with respect to the vehicle floor 10 and has slidably disposed therein a piston 16 and piston rod 18 which are fixed with respect to the vehicle seat. Therefore, when hydraulic fluid is introduced into the rear end 20 of cylinder 14, piston 16 and piston rod 18 are displaced forwardly relative to cylinder 14, and, in turn, cause the seat 2 to move forwardly along the spaced apart guide rails, not shown. Conversely, when hydraulic fluid is permitted to escape from the rear end 20 of cylinder 14, the tensioned coil spring 22 acts through the linkage 24 to return piston 16 and piston rod 18 to their rearwardmost position within cylinder 14, thereby actuating the seat 2 rearwardly on the rails, previously mentioned.

To introduce and exhaust fluid from cylinder 14 and thereby accomplish fore and aft displacement of the seat in the manner described, there is provided a hydraulic fluid control system which is manually remotely controlled by means of a two-position electrical switch 26. Electrical switch 26 is preferably disposed on a vehicle seat in a location convenient to the vehicle operator. Disposed at various locations throughout the hydraulic circuit are a plurality of solenoid type valves which will be described in detail shortly. Certain of the solenoid valves are operable responsive to movement of switch 26 to one or the other of its operating positions, while one of the valves is operable responsive to a normally open plunger type switch 28 which is mounted in the vehicle door sill 30 for actuation responsive to opening and closing movement of the door 32.

As seen in the drawings, the hydraulic system comprises a fluid reservoir 34 which is connected in communicating relation with the input side 36 of an electrically driven hydraulic pump 38 by means of a fluid conduit 40. At its output side 42, pump 38 is connected to a fluid conduit 44 which, in turn, communicates with one side of a normally closed solenoid operated valve 46. At its opposite side, valve 46 is connected to fluid conduit 48 which, in turn, communicates with the interior of the rearward end 20 of hydraulic cylinder 14. Midway between cylinder 14 and valve 46, a fluid conduit 50 is connected in communicating relation with conduit 48, the opposite end of which is connected to one side of a normally closed solenoid operated valve 52. At its opposite side, valve 52 is connected to a fluid conduit 54 which, in turn, communicates with a fluid conduit 56. One end 58 of conduit 56 communicates with the interior of reservoir 34 while the opposite end thereof is connected to a two way solenoid operated valve 60. Valve 60, in turn, is connected to a fluid conduit 62, the opposite end of which is connected to conduit 44 between pump 38 and solenoid valve 46. Valve 60 is also connected to a fluid conduit 64, the opposite end of which communicates with the interior of the forward end 66 of an idler cylinder 68. Valve 60 is normally aligned to provide communication between conduits 62 and 64.

Slidably disposed in cylinder 68 is a piston 70. At its rearward end, cylinder 68 is connected in communicating relation with a fluid conduit 72, the opposite end of which is connected to conduit 50 between solenoid valve 52 and the juncture of conduit 50 with conduit 48. When connected in the manner described, the hydraulic system is operable to provide both conventional operator controlled fore and aft adjustment of seat 2 and to accomplish automatic temporary rearward displacement of the seat 2 and return thereof responsive to correlated open and closed positions of the vehicle door 32. Solenoid operated valves 46, 52 and 60, previously referred to, are connected by electrical circuits, shown in Fig. 5, which cause movement of the valves to positions, presently to be described, upon movement of operator controlled switch 26 or door responsive switch 28, while the electrically operated pump 38 is connected to a separate circuit which is automatically energized by a pressure responsive switch 74 disposed in conduit 44. Switch 74 is adjusted to maintain pump 38 inoperative as long as a predetermined static pressure exists in conduit 44.

In order that the operation of the mechanism may be clearly understood, a description of the sequence of each of the four modes of operation and the related hydraulic fluid flow path will be given.

*Manually controlled rearward seat adjustment*

Switch 26 which is connected to a source of power 76, is manually moved to the right from a central neutral position to energize the electrical circuit 78 to solenoid valve 52. Solenoid valve 52 then rotates to the position shown in Fig. 1, thus opening the circuit between the rearward end 20 of cylinder 14 and reservoir 34. Spring 22 then contracts and applies force through linkage 24 to displace piston 16 rearwardly in cylinder 14. Since the conduits 48, 50, 54 and 56 provide an open circuit between cylinder 14 and reservoir 34, fluid displaced from cylinder 14 by the pressure of spring 22 on piston 16 is discharged into reservoir 34. When seat 2 reaches the desired rearward position, switch 26 is released and returns to the neutral position, permitting valve 52 to return to its normally closed position and arresting further flow of hydraulic fluid from cylinder 14.

*Manually controlled forward seat adjustment*

Switch 26 is moved to the left from the central neutral position to energize the electrical circuit 80 to solenoid valve 46. Valve 46 is rotated to a position providing an open circuit between pump 38 and cylinder 14. Because of pressure drop in conduit 44, pressure switch 74 energizes pump 38. Fluid under pressure from pump 38 then passes through conduits 44 and 48 into cylinder 14 displacing piston 16, piston rod 18 and seat 2 forwardly. While the circuit is also open through conduits 50 and 72, fluid movement therethrough is prevented by piston 70 in idler cylinder 66, since an equal force is exerted on the opposite side thereof by fluid pressure applied through conduit 62, valve 60 and conduit 64. When seat 2 reaches the desired forward position as a result of forward displacement of piston 16, switch 26 is released and returns to the neutral position causing valve 46 to close. Pressure in conduit 44 then increases until pressure switch 74 deenergizes pump 38.

*Automatic rearward seat displacement*

Figure 2:
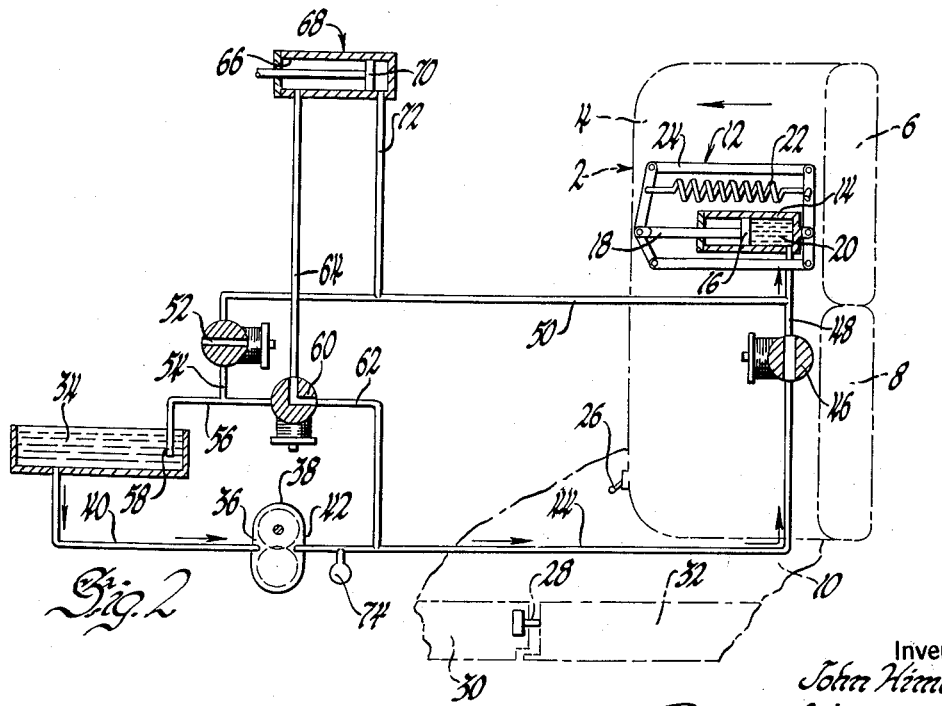
Fig. 2 is a view similar to Fig. 1 depicting the valving and flow path of oil when the seat is actuated rearwardly by the manually controlled selector.

Vehicle door 32 is swung to open position permitting switch 28 to move rearwardly to a position energizing the electrical circuit 82 to solenoid valve 60 which moves from the normal position shown in Figs. 1 and 2 to the position shown in Fig. 3, whereby hydraulic fluid is permitted to pass from the rearward end 20 of cylinder 14 through conduits 48, 50 and 72 to the rearward end of idler cylinder 68 responsive to contraction of spring 22, thereby displacing piston 70 forwardly in cylinder 68, causing hydraulic fluid in the forward end of idler cylinder 68 to be displaced through conduits 64 and 56 into reservoir 34. Thus, the amount of hydraulic fluid displaced from the rearward end of cylinder 14 is temporarily stored in the rearward end of idler cylinder 68 at one side of piston 70.

*Automatic forward return of seat*

Upon closing of door 32, switch 28 is moved forwardly to its open position deenergizing the electrical circuit 82 to solenoid valve 60. Valve 60, therefore, returns to the position shown in Fig. 4 providing an open circuit from pump 38 through conduits 62 and 64 to the forward end of idler cylinder 66 which causes the static pressure in conduit 44 to drop. Pressure drop in conduit 44 then causes pressure switch 74 to energize pump 38. Therefore, fluid under pressure is directed through conduit 62 and 64 into the forward end of idler cylinder 68, causing piston 70 to move rearwardly. As piston 70 moves rearwardly, all fluid in the rearward end thereof is returned through conduits 72, 50 and 48 into the rearward end 20 of cylinder 14, thereby returning piston 16 and seat 2 to the position previously selected manually by the operator. Since piston 70 "bottoms" as soon as all fluid in the rearward end of idler cylinder 68 is discharged, further passage of fluid through conduits 62 and 64 is arrested and static pressure is again built-up in conduit 44 until pressure switch 74 deenergizes pump 38.

Of particular importance in the present invention is the "memory" feature provided by the idler storage cylinder 68. Because the volume of fluid temporarily stored in the rearward end of cylinder 68 is equal to the amount displaced from cylinder 14 by temporary rearward movement of the seat, it will be apparent that the seat will always return to the position previously selected by the vehicle operator, since only the fluid temporarily stored in cylinder 68 is returned to cylinder 14 during the automatic return cycle. As a result, greatly increased ease of exit and entrance to the seat is provided without requiring repeated manual relocation of the seat after each sequence of operation.

From the foregoing it will be seen that a novel and highly effective seat control mechanism has been devised. The present invention not only permits full utilization of the normal advantages of power operated seat adjusters, but in addition, increases the flexibility and utility thereof to an extent hitherto unobtainable.

While but one embodiment of the invention has been shown and described, it will be evident that numerous changes and modifications may be made therein. It is, therefore, to be understood that it is not intended to limit the invention to the embodiments shown but only by the scope of the claims which follow.

I claim:

1. In a vehicle having a door mounted thereon for opening and closing movement and a seat structure mounted thereon for horizontal movement to a plurality of seat positions including a rearward limit position, the combination comprising, power operated means operatively connected to said seat structure for moving said structure relative to said vehicle to any one of said plurality of seat positions, manually operable control means for actuating said power operated means to move said seat structure to a selected any one of said plurality of seat positions, and control means responsive to opening and closing movement of said door for controlling said power operated means to sequentially move said seat structure from said selected any one of said plurality of seat positions to said rearward limit position upon opening movement of said door and to move said seat structure from said rearward limit position to said selected any one of said plurality of seat positions upon closing movement of said door to thereby facilitate passenger ingress and egress.

2. In a vehicle having a door mounted thereon for opening and closing movement and a seat structure mounted thereon for horizontal movement to a plurality of seat positions including a rearward limit position, the combination comprising, an extensible and retractable power actuator operatively connected to said seat structure for moving said structure relative to said vehicle manually operable control means for controlling said actuator to move said seat structure to a selected one of said any one of said plurality of seat positions, and control means responsive to opening and closing movement of said door for controlling said actuator to sequentially move said seat structure from said selected any one of said plurality of seat positions to said rearward limit position upon opening movement of said door and to move said seat structure from said rearward limit position to said selected any one of said plurality of seat positions upon closing movement of said door to thereby facilitate passenger ingress and egress.

3. In a vehicle having a seat structure mounted thereon for horizontal movement to a plurality of seat positions including a rearward limit position, the combination comprising, fluid pressure operated means operatively connected to said seat structure for moving said seat structure relative to said vehicle, means for introducing and exhausting fluid pressure to and from said fluid pressure operated means to move said seat structure relative to said vehicle to a selected one of said plurality of seat positions, a storage chamber communicating with said pressure operated means, and door responsive control means responsive to opening movement of said door to cause fluid pressure to be exhausted from said pressure operated means into said storage chamber to thereby move said seat structure to said rearward limit position and responsive to closing movement of said door to cause return of said fluid pressure from said storage chamber into said pressure operated means to return said seat structure to said selected seat position.

4. In a vehicle seat, a fluid pressure responsive extensible means for moving said seat forwardly and rearwardly, a main fluid reservoir, means for introducing and exhausting fluid from said main reservoir into and out of said pressure responsive means, manual control means for said pressure responsive means for moving said seat to a selected position, an idler chamber communicating with said pressure responsive means, additional control means effective in one position to cause fluid exhausted from said pressure responsive means to pass temporarily into said idler chamber, said additional control being effective in another position to cause return of fluid from said idler chamber into said pressure means whereby said seat is returned to its original selected position.

5. In a vehicle having a door, a seat adjuster comprising a hydraulic power cylinder connected between said seat and said vehicle, a source of hydraulic fluid, conduit means connecting said source of fluid and said cylinder, fluid pressure generating means interposed in said conduit means, valve means associated with said conduit means for regulating the flow of said fluid, manually operable control means for operating said fluid pressure generating means and said valve means, said control means being effective in one position to cause introduction of fluid under pressure into said power cylinder to urge said seat forwardly in said vehicle and in another position to permit return flow of said fluid from said cylinder to said source, a temporary storage chamber communicating with said conduit means, additional valve means regulating fluid flow into and out of said storage chamber, and a second control means for said additional valve means, said second control means being disposed adjacent said door in a manner whereby opening movement of the latter permits movement of said control means to a position permitting flow of fluid from said power cylinder into said idler cylinder, thereby urging said seat to its rearwardmost position, said second control means being moved to a position upon closing of said door causing return flow of said fluid in said idler cylinder to said power cylinder to return said seat to its original position of adjustment.

References Cited in the file of this patent

UNITED STATES PATENTS

| | | |
|---|---|---|
| 2,034,233 | Hasselbaum | Mar. 17, 1936 |
| 2,117,409 | Dorsey | May 17, 1938 |
| 2,242,247 | Grant | May 20, 1941 |
| 2,360,227 | Hemphill | Oct. 10, 1944 |
| 2,568,930 | Parsons | Sept. 25, 1951 |
| 2,587,679 | Atkinson | Mar. 4, 1952 |
| 2,658,341 | Eames | Nov. 10, 1953 |
| 2,660,223 | Appleton | Nov. 24, 1953 |
| 2,696,403 | Baugh | Dec. 7, 1954 |
| 2,715,433 | Dologorukov | Aug. 16, 1955 |
| 2,823,949 | Williams et al. | Feb. 18, 1958 |
| 2,829,002 | Leavengood et al. | Apr. 1, 1958 |